United States Patent
Van Der Zwan (10) Patent No.: US 11,526,577 B2
(45) Date of Patent: Dec. 13, 2022

(54) METHOD AND SYSTEM FOR PROVIDING A WEBSITE AND A STANDALONE APPLICATION ON A CLIENT DEVICE USING A SINGLE CODE BASE

(71) Applicant: EasyWebApp Inc., Whitby (CA)

(72) Inventor: Ronald Johannes Van Der Zwan, Whitby (CA)

(73) Assignee: EasyWebApp Inc.

( * ) Notice: Subject to any disclaimer, the term of this patent is extended or adjusted under 35 U.S.C. 154(b) by 0 days.

(21) Appl. No.: 17/561,443

(22) Filed: Dec. 23, 2021

(65) Prior Publication Data
US 2022/0215060 A1 Jul. 7, 2022

Related U.S. Application Data (60) Provisional application No. 63/133,317, filed on Jan. 2, 2021.

(51) Int. Cl.
*G06F 16/958* (2019.01)
*G06F 16/953* (2019.01)

(52) U.S. Cl.
CPC .......... *G06F 16/958* (2019.01); *G06F 16/953* (2019.01)

(58) Field of Classification Search
None
See application file for complete search history.

(56) References Cited

U.S. PATENT DOCUMENTS

| | | | | |
|---|---|---|---|---|
| 2012/0274863 | A1* | 11/2012 | Chardon | G06F 3/04886 348/734 |
| 2014/0047413 | A1* | 2/2014 | Sheive | H04L 65/403 717/110 |
| 2015/0077326 | A1* | 3/2015 | Kramer | G06F 3/0346 345/156 |

OTHER PUBLICATIONS

Lepage, Pete, "Provide a Custom install experience", Web Page <https://web.dev/customize-install/>, 8 pages, Feb. 14, 2020, retrieved from Internet Archive Wayback Machine <https://web.archive.org/web/20200228113900/https://web.dev/customize-install/> on Mar. 7, 2022.

\* cited by examiner

*Primary Examiner* — Phuoc H Nguyen
(74) *Attorney, Agent, or Firm* — Charlene M. Lipchen (57) ABSTRACT

A method and system for providing a progressive web app (PWA) having a plurality of display modes. The method comprises providing a single code base hosted on a server, the single code base having a shell index file and a plurality of index files corresponding to the plurality of display modes. Each display mode has corresponding display mode content, the display mode content of one display mode performing different functions and operations compared to the display mode content of any of the other display modes. When the PWA is accessed, the shell index file detects whether the PWA was accessed by a browser, a bookmarked PWA standalone web app or other access point, determines the corresponding display mode, and displays the corresponding display mode content.

18 Claims, 5 Drawing Sheets

METHOD AND SYSTEM FOR PROVIDING A WEBSITE AND A STANDALONE APPLICATION ON A CLIENT DEVICE USING A SINGLE CODE BASE

CROSS-REFERENCE TO RELATED APPLICATIONS

This application claims the benefit of U.S. Provisional patent application No. 63/133,317 filed on Jan. 2, 2021 and entitled "Website to App Change Method", which is incorporated herein by reference.

FIELD

The present application relates to progressive web applications.

BACKGROUND

Devices having the capability of connecting to the Internet have become increasingly mobile and pervasive. Devices including smart phones, tablets, laptops and desktop computers are used for performing various functions. Web development has provided increasing functionality, enabling websites that provide portals and services for consumers, ranging from online shopping, banking and investing, conducting business and education, social media and research, amongst other functions.

Although many such services may be provided on a website, accessed by a web browser program installed on the device, it may be desired to access those same services when the device is not connected to the internet. It may also be convenient for end users to access services through a separate application, or "native app", that is installed on the device. Native apps often provide desirable additional functionality to the end user that is not available on a corresponding website, may store files locally on a memory of the device so that the native app may be used even when the device is not connected to the internet, and may offer ease of access to the end user by allowing the end user to open the native app through an icon displayed on the home page of the device's user interface.

However, a known issue with deploying and maintaining native apps is that it is necessary to produce different versions of the native app capable of operating on different operating systems in order to make the native app available to users of different devices; examples of popular operating systems include Apple™ iOS™ used on Apple™ smartphones, tablets and desktop computers; Windows™ used on tablets and desktop computers of various different manufacturers; and Android™ used on smartphones of various different manufacturers. Thus, if a software developer wishes to offer a native app to users of the three different operating systems mentioned above, it is necessary for the software developer to code and then maintain three different versions of the native app having three different code bases. Furthermore, because operating systems are often upgraded, the developer of a native app for these three different operating systems may also find it necessary to support the native app for two or more versions of each operating system. Developing and supporting native apps across different platforms increases the overall cost and complexity of providing the native app to a user base. For this reason, native apps may only be available to users of one or two different operating systems.

Presently, native apps are made available for download through app stores. Presently, a small number of app stores, including Apple App Store™, Microsoft Windows Apps™ and Google Play™, have captured most of the available market share. The proprietors of each respective app store serve as gatekeepers, performing an assessment of a proposed native app before it is made available in that app store. The app stores collect a commission for the native app downloaded from the app store.

If a developer wishes to update a native app, they must make the update available to the end user through the app store. The end user may or may not receive a push notification from the native app, informing the end user that an updated version of the app is available. However, the end user must visit the app store to download and then install the native app update. If the native app does not notify the end user when a new update is available, the end user may need to frequently access the app store to proactively check for the availability of app updates, or otherwise forego using the most updated version of the native app.

Progressive web apps ("PWA") provide most of the functions of a native app, but are delivered in the form of a web app that is accessed through the web browser program installed on the end user device. Unlike a web app, which can only be accessed through a web browser, a PWA may be bookmarked to the user interface of an end user's device (also referred to herein as the "client device"). The user interface of the client device may include, but is not limited to, a graphical user interface, a home screen, a desktop and/or a system tray. When a PWA is bookmarked on the end user's device, a program called a service worker, along with the PWA content, is downloaded onto the end user's device, and the end user may access the PWA either through, for example, an icon saved onto the home screen of the device's user interface, or through the web browser. When the PWA is accessed from the end user device, the service worker retrieves the PWA content, either from a server accessed over the internet, or if the device is not connected to the internet, the service worker retrieves the PWA content stored locally on the end user's device. Thus, the PWA may be used when the device is not connected to the internet. However, the content and functionality of the PWA is the same, regardless of whether the end user accesses the PWA through the web browser or directly from the PWA icon bookmarked on the end user's device. When the PWA is accessed through an icon saved on the home screen of the device, the PWA is displayed in a window that looks like a native app in appearance, rather than being displayed within a web browser frame.

SUMMARY

A PWA having at least two different display modes is provided, which gives the software developer the ability to provide an end user with different content, functions and experiences depending on whether the end user accesses the PWA through a web browser or directly through the PWA bookmarked on the client device, using a single code base for the PWA. When the PWA is accessed, the PWA display mode that is launched depends on how the end user accessed the PWA.

In one aspect, each display mode of the PWA may be launched on the end user's device, depending on how the PWA is accessed. For example, in some embodiments, the PWA includes a browser display mode and a standalone web app display mode. The browser display mode is displayed when the PWA is accessed through a web browser, and the standalone web app display mode is displayed when the PWA is accessed directly from a bookmark link saved to the user interface of the end user device, such as through an icon bookmarked on the home screen of the device. In some embodiments, the triggering of a particular display mode is accomplished by providing the PWA with a shell index file that includes a media query, the end result of the media query being to determine whether the shell index file was accessed by a web browser program or by a bookmarked PWA that was previously saved to the end user device. The media query of the shell index file determines the appropriate display mode, and then links to one index file of the two or more index files, each index file representing a display mode of the PWA. In the example given above, the shell index file links to a standalone web app index file, listing the content and the functions for the standalone web app display mode, and a website index file, listing the content and the functions for the browser display mode.

Advantageously, a PWA having two or more display modes provides a software developer with increased flexibility with respect to providing different content and functions in a web app and in a standalone web app, which allows the standalone web app to have greater flexibility in terms of offering different functions and content as compared to the website version of the PWA. This allows the standalone web app display mode to behave like a native app. At the same time, because the standalone web app display mode is a PWA, both the standalone web app display mode and the browser display mode are deployed to the end user device through a single code base.

The nature of the PWA, having two or more display modes, confers advantages from a software development perspective, such as removing the resource burden of having to deploy several different versions of a native app for use on different operating systems, and decoupling the availability of the app from a third party app store. In other words, the standalone web app display mode of the PWA is accessed directly from the PWA website, where an "install app" command initiated within the web browser enables the end user to bookmark the PWA standalone web app directly onto the device, without having to obtain the PWA standalone web app from a third party app store. In some embodiments, optionally, the PWA having two or more display modes may also be made available from a third party app store.

A further advantage of providing a PWA having two or more display modes, from both a developer and an end user perspective, is that the standalone web app display mode of the PWA may be automatically updated every time the PWA is accessed directly from the end user device. In some embodiments, when the PWA standalone web app display mode of the PWA is accessed, the service worker program installed on the end user device compares a version ID of that locally installed service worker to a version ID of the service worker of the PWA hosted on a remote server, when the end user device is connected to a network in communication with the server, such as the internet. If the prior version ID of the locally installed service worker is different from the version ID of the service worker hosted on the remote server, then the service worker program and the corresponding PWA standalone web app content stored on the client device are automatically updated with the updated version of the service worker program, having the current and up to date version ID, that is hosted on the remote server. This process may occur in the background, with or without notice to the end user, in which case the content and functionality of the standalone web app display mode may be seamlessly updated without requiring any positive action from the end user. This process is similar to how updated website content is automatically accessed, from the end user's perspective, whenever an updated website is re-accessed by an end user through a web browser.

It will be appreciated by a person skilled in the art that the advantages of the PWA disclosed herein, as described above and as will be apparent to a person skilled in the art, contribute to the improved functioning of a computer, for example by providing for increased efficiency in the deployment of applications for computing devices and the continual updating of those applications, without the need to deploy or update the applications through a third party app store. From both a development and an end user perspective, additional efficiencies are achieved by providing for the deployment and updating of applications across multiple platforms and operating systems using a single code base.

In one aspect, a method for providing a progressive web app (PWA) having a first display mode content that is distinguished from a second display mode content of the PWA to thereby improve functioning of a client device is provided. The method comprises: providing a single code base hosted on a server, the single code base comprising a first display mode content, a second display mode content and a shell index file, the shell index file configured to point to a first index file corresponding to the first display mode content when a first display mode is detected or to a second index file corresponding to the second display mode content when a second display mode is detected. When a browser installed on a client device accesses the shell index file, the shell index file points the browser to the first index file to retrieve the first display mode content from the server. When a second display mode access point bookmarked on the client device accesses the shell index file, the shell index file points a service worker program installed on the client device to the second index file to retrieve the second display mode content from a memory of the client device or from the single code base hosted on the server. The second display mode content comprises second display mode functions and the first display mode content comprises first display mode functions, the first display mode functions performing different operations than the second display mode functions. In some embodiments, the first display mode is a browser display mode, the first display mode content is a browser content comprising first display mode functions that are website functions; and the second display mode is a standalone web app display mode and the second display mode content is a standalone web app content comprising second display mode functions that are app functions, the standalone web app content being accessed through the second display mode that is a PWA standalone web app bookmarked to the client device.

The method may further include providing for installation of the PWA standalone web app on the client device, wherein when a bookmark instruction is initiated on a PWA website accessed through the browser installed on the client device a bookmark link is added to a user interface of the client device, and when the bookmark link is actuated the service worker program is retrieved from the single code base hosted on the server and installed on the client device, and the PWA standalone web app content is retrieved from the single code base and stored on the memory of the client device.

In another aspect, a method for providing a progressive web app (PWA) website and a PWA standalone web app on a client device from a single code base improves the functioning of a client device. The method comprises: providing a single code base hosted on a server, the single code base defining a PWA, the PWA comprising a service worker program installable on the client device and a PWA manifest; providing for a first media query performed by a web browser installed on the client device, wherein the first media query retrieves a browser display mode and a retrieve pages module retrieves PWA website content of the PWA from the single code base hosted on the server and displays the said PWA website content on the web browser; providing for a second media query performed by the web browser of a PWA standalone web app bookmarked on the client device, wherein the second media query retrieves a standalone web app display mode and a retrieve pages module retrieves PWA standalone web app content of the PWA stored on a memory of the client device or from the server and displays the said PWA standalone web app content through the PWA standalone web app bookmarked on the client device; and wherein the PWA website content comprises functions and user interfaces that are different from functions and user interfaces of the PWA standalone web app content.

In another aspect, a server hosting a single code case defining a progressive web app (PWA) is provided. The server comprises: a PWA stored on a computer readable memory of the server, the PWA comprising a service worker program installable on a client device, a PWA manifest and a PWA shell index file, the PWA shell index file defining a browser display mode for displaying a PWA website content and a standalone web app display mode for displaying a PWA standalone web app content. The PWA website content comprises functions and user interfaces that are different from functions and user interfaces of the PWA standalone web app content. The browser display mode is automatically initiated when the PWA is accessed by a web browser installed on the client device. The standalone web app display mode is automatically initiated when the PWA is accessed by a PWA standalone web app bookmarked on the client device.

In another aspect, a method for streamlining the continuous integration and continuous development of a website and a software application that is deployed on a client device is provided. The method comprises: providing a single code base hosted on a server, the single code base defining a PWA, the PWA comprising a service worker program, a PWA manifest and a shell index file; providing access to the shell index file performed by a web browser installed on the client device, wherein a first media query of the shell index file retrieves a browser display mode and the web browser retrieves a PWA website content of the PWA from the single code base hosted on the server and displays the said PWA website content on the web browser; providing for access to the shell index file performed by a PWA standalone web app bookmarked on the client device, wherein a second media query of the shell index file retrieves a standalone web app display mode and the service worker program retrieves a PWA standalone web app content of the PWA from the server or from a memory of the client device and displays the said PWA standalone web app content through the PWA standalone web app bookmarked on the client device, wherein the PWA website content comprises functions and user interfaces that are different from functions and user interfaces of the PWA standalone web app content; integrating an updated PWA standalone web app content into the PWA by updating the single code base hosted on the server to replace the service worker program with an updated service worker program, the updated service worker program having a current version ID and comprising the said updated PWA standalone web content; automatically updating the service worker program of the PWA standalone web app bookmarked on the said client device, the said service worker program having a prior version ID, when the second media query detects a mismatch between the said prior version ID of the service worker program installed on the client device and the current version ID of the updated service worker program of the single code base hosted on the server.

In some embodiments, method for streamlining the continuous integration and continuous development of a website and a software application that is deployed on a client device further comprises: integrating an updated PWA website content into the PWA by updating the single code base hosted on the server to replace the PWA website content with the updated PWA website content.

DETAILED DESCRIPTION

Figure 1:
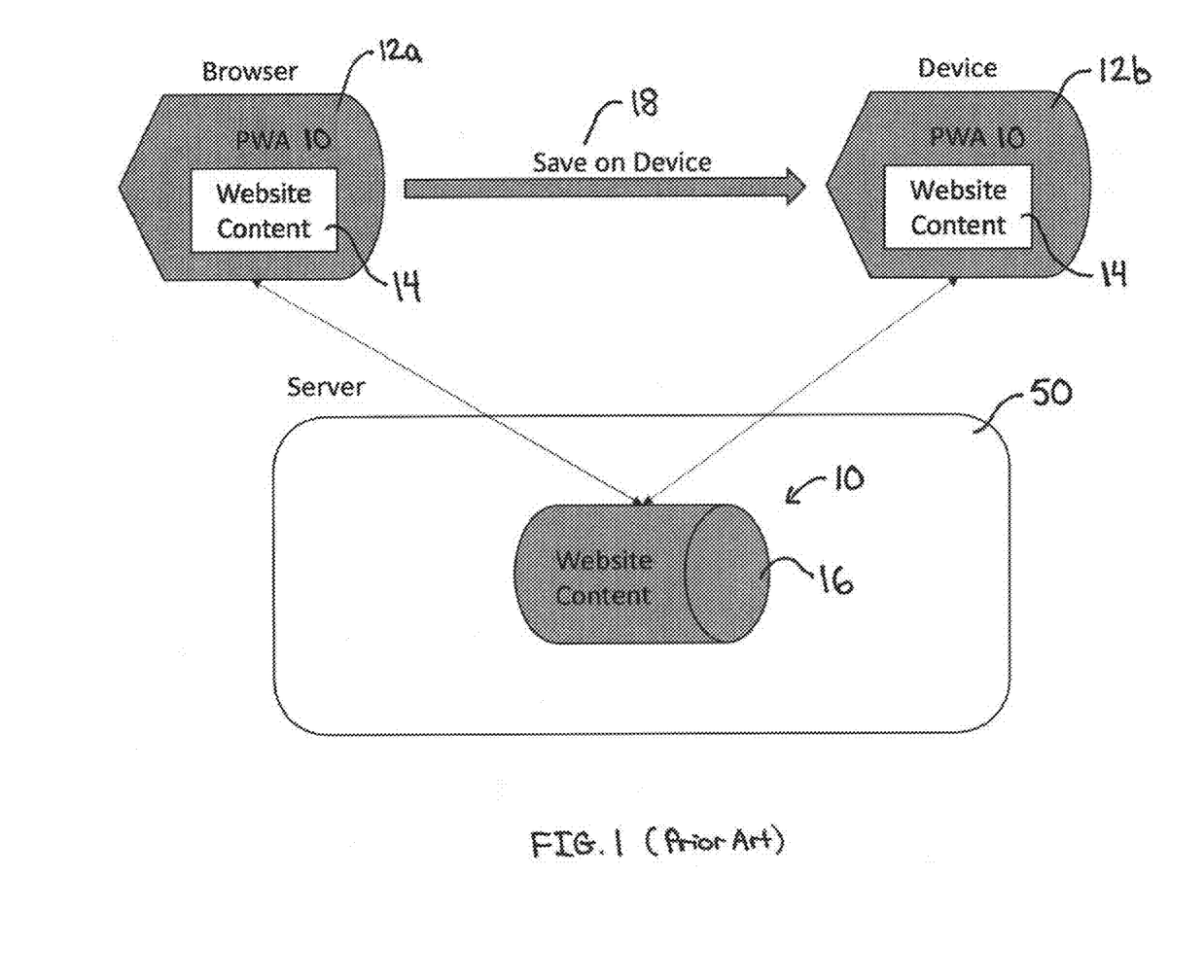
FIG. 1 is a schematic diagram, illustrating a system for providing a PWA with a single display mode as is known in the prior art.

Known PWA technology enables the bookmarking of a PWA to a client device, which may be a computing device that includes but is not limited to a desktop computer, a smartphone or a tablet (hereinafter, collectively and individually referred to as a "client device"). Referring to FIG. 1, a prior art PWA 10 comprises a service worker program and a website content 16, all of which is hosted on a server 50. The server 50 is accessed by the client device over a network, such as the Internet. When an end user navigates to the PWA website, using a web browser program 12a installed on the client device, the web browser detects that the website is a PWA website. The end user is presented with an option, either as an "install app" button located on the address bar of the web browser program, and/or through an "install app" button provided directly on the PWA webpage, to bookmark the PWA app directly onto the client device. When the bookmark instruction 18 is initiated by the end user, for example by clicking on the "install app" button or link, the web browser program retrieves the PWA service worker program from the server 50 and installs the service worker program onto the client device. The web browser program also retrieves the website content 16 from the server 50 and saves it in a memory of the client device.

After this initial bookmarking process has been completed, a link to the PWA app is provided on the client device, which for example may appear as an icon on the home page of the client device, or as an icon in the system tray of the device's graphical user interface. Thereafter, the website content 14 may be viewed on the client device, either by navigating to the PWA website through the web browser program 12a, or by opening the bookmarked PWA app saved on the client device (such as by clicking on the PWA app icon). From an end user's perspective, a PWA app appears on the client device like a native app, in that clicking on the PWA app's icon will open the PWA in a new window without the frame of the web browser program. However, in the background, clicking on the PWA app icon initiates the service worker program installed on the device, which works together with the web browser program installed on the client device to retrieve the website content 16 from the server 50, or if the client device is not connected to the internet, the website content is retrieved from the memory of the client device.

Significantly the prior art PWA has a single display mode, meaning that the PWA displays identical content and functionality 14, regardless of whether the PWA is accessed by navigating to the PWA website via a web browser program 12a installed on the client device, or whether the PWA is accessed through a bookmarked link 12b saved onto the client device. For example, a typical PWA designed for a restaurant may provide certain functions, such as allowing an end user to log into a loyalty account and track, collect and use loyalty points for ordering food from the restaurant, and other functions such as ordering food from the restaurant for pickup or delivery. The PWAs content may include an online ordering menu, enabling the end user to select and order food from the restaurant. In such prior art PWAs, the functions of tracking, collecting and using loyalty points for ordering food from the restaurant, and for ordering food from the restaurant for pickup or delivery, as well as the content of the online ordering menu, is identical regardless of whether the end user accesses the PWA from the web browser program, or from the PWA app that is bookmarked on the client device.

Figure 2:
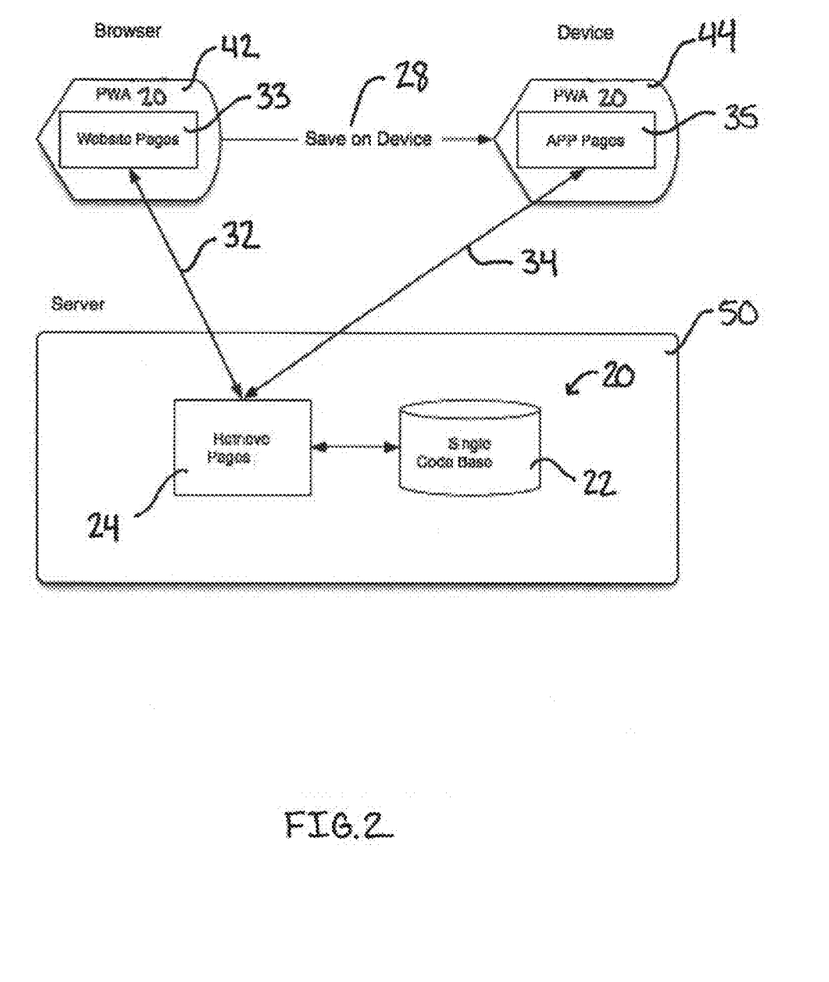
FIG. 2 is a schematic diagram, illustrating a system for providing a PWA with two display modes in accordance with an embodiment of the present disclosure.

Referring to FIG. 2, and in contrast to the prior art PWA illustrated in the schematic diagram of FIG. 1, the PWA 20 has two different display modes, whereby each display mode has different functions and/or content, depending on how the PWA is accessed by the client device. Although the example embodiment of a PWA 20 discussed herein and illustrated in FIG. 2 has two display modes, it will be appreciated that the same methods and principles described herein may be used to provide a PWA having three or more display modes.

The PWA 20 is defined by a single code base 22, the single code base of the PWA comprising a service worker program and a PWA manifest. Additionally, the content for each of the two different display modes is hosted on the server 50. A retrieve pages module 24 of the PWA, hosted on the server 50, receives and processes first and second media queries 32, 34 from the client device. For example, when the PWA website is accessed through a web browser program 42 installed on the client device, the first media query 32 detects a first display mode, which in this illustrative example is a browser display mode. As a result of detecting the browser display mode, the web browser program 42 retrieves the PWA website content 33, comprising the website pages and the website functions, and displays the PWA website content 33 on the web browser program 42 installed on the client device.

When an end user navigates to the PWA website through the web browser program 42, the web browser program detects that the website is a PWA website, and the end user may initiate a bookmark instruction 28 by clicking on an "install app" button or link, which may appear for example in the address bar of the web browser program or an "install app" button or link displayed on a webpage of the PWA website. When the end user initiates the bookmark instruction 28, the website browser retrieves the service worker program from the server 50 and installs the service worker program on the client device; additionally, the PWA standalone web app content 35 is retrieved from the server 50 and stored on a memory of the client device.

After the PWA standalone web app has been bookmarked on the client device, the PWA may be accessed via the bookmark link 44 saved on the client device, for example by clicking on the PWA standalone web app icon that appears on the home screen of the client device. When the PWA standalone app has been launched, a second media query 34 is performed by the service worker program installed on the client device; the second media query 34 detects a second display mode, which in this example is a standalone web app display mode. As a result of detecting the standalone web app display mode, the PWA standalone web app retrieves the PWA standalone web app content 35 from the retrieve pages module 24 hosted on the server 50, when the client device is in communication with the server 50 over a network. Thus, the PWA standalone web app content 35, which comprises of app content and app functions that are different from the PWA website content and website functions, is displayed on the client device.

Figure 4:
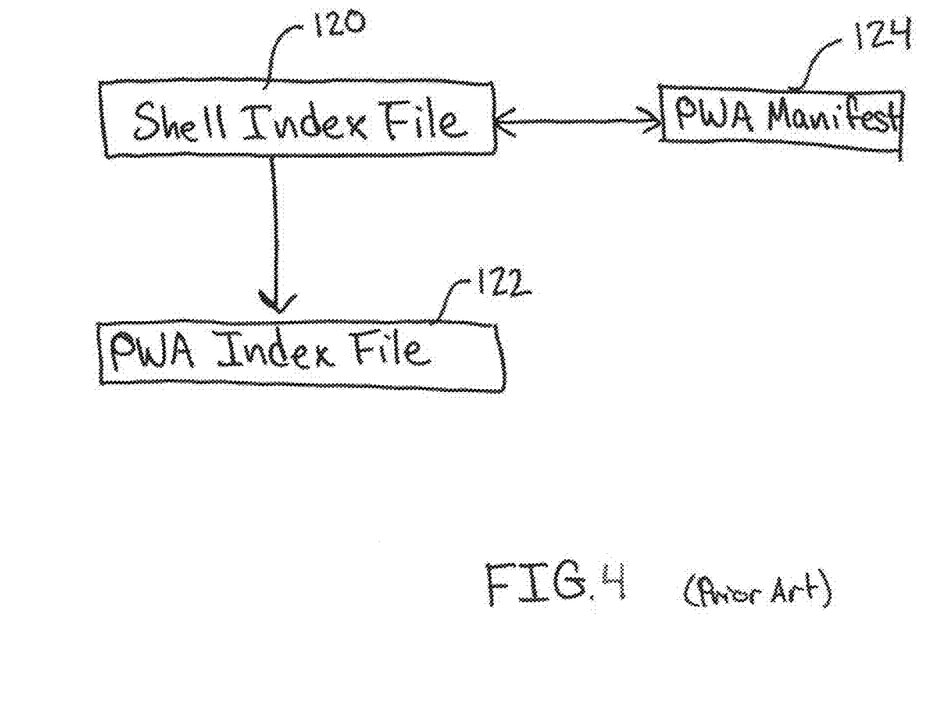
FIG. 4 is a schematic diagram, illustrating an index file structure for providing a PWA with a single display mode as is known in the prior art.

In one aspect of the present disclosure, providing a PWA with at least two display modes wherein the content and functionality of the PWA depends on how the PWA was accessed, is facilitated by using shell index files. In the prior art, as illustrated in FIG. 4, a shell index file may be used for a prior art PWA to speed up the loading of a PWA website in a web browser program, when an end user first navigates to the PWA website. The shell index file is an initial index file that is accessed by the web browser program before the PWA index file is accessed and fully loaded in the web browser program. The shell index file 120 may, for example, supply a screen paint for display in the web browser program, so that the end user perceives a faster loading of the webpage before the webpage is fully loaded and functional. The shell index file 120 thus enables fast loading of a visual display of the webpage, while the various functions and other content of the webpage are continuing to be loaded in the web browser program from the PWA index file 122. Additionally, the PWA manifest 124, also accessed via the shell index file 120, enables detection by the web browser that the website is a PWA website.

Figure 5:
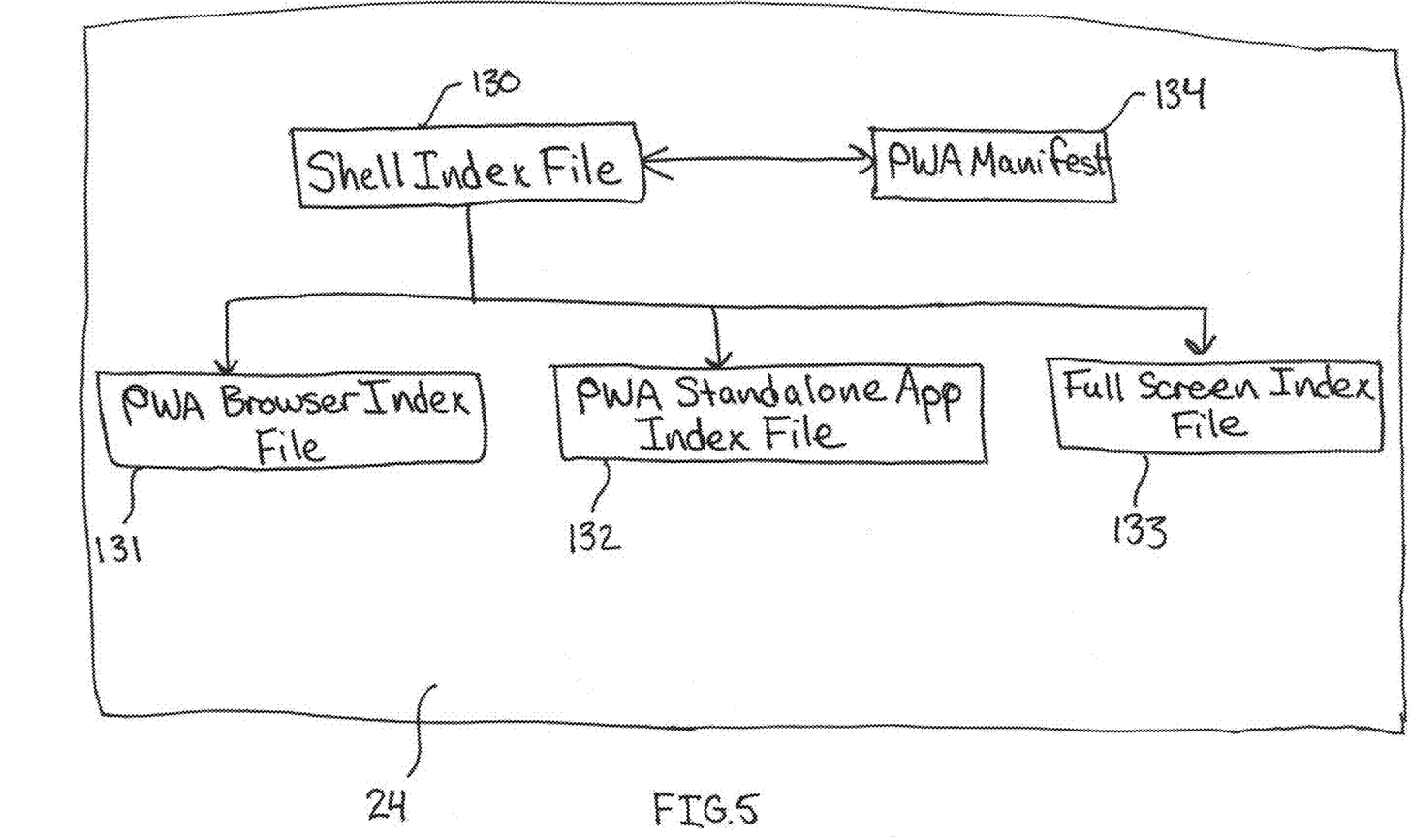
FIG. 5 is a schematic diagram, illustrating an index file structure for providing a PWA with two display modes in accordance with an embodiment of the present disclosure.

In contrast, as illustrated in FIG. 5, the retrieve pages module 24 comprises a shell index file 130 linked to a plurality of index files, such as first, second and third index files 131, 132 and 133 representing first, second and third display modes respectively. It will be appreciated that although three index files are illustrated in FIG. 5, a PWA designed in accordance with the present disclosure may comprise a shell index linking to two index files or greater than three index files, representing a corresponding number of display modes.

The shell index file 130 is initially accessed when the PWA is accessed by the client device. The shell index file 130, which is linked to the PWA manifest 134, performs detection of the display mode via a media query, depending on how the PWA is being accessed. For example, without intending to be limiting, the PWA may be accessed through the web browser program, the bookmarked standalone web app, or via a full screen command initiated by the end user in either the web browser program or the standalone web app. In some embodiments, the screen paint contained in the shell index file may be a splash screen containing a logo, and the splash screen may be the same regardless of which display mode will be initiated. In other embodiments, the screen paint contained in the shell file may include different screen paints for each of the different display modes of the PWA. Once the display mode has been determined, the shell index file points to one of three index files. In the example illustrated at FIG. 5, the PWA browser index file 131 lists the browser content for the PWA browser display mode; the PWA standalone app index file 132 lists the standalone web app content for the PWA standalone web app display mode; and the full screen index file 133 listing the full screen content for the full screen display mode of the PWA. Thus, in addition to providing the end user with the perception of faster loading of the PWA content, the shell index file serves a second purpose, in the present disclosure, of providing an index file structure having a shell index file that points to two or more different index files, depending on the display mode being initiated.

Figure 3:
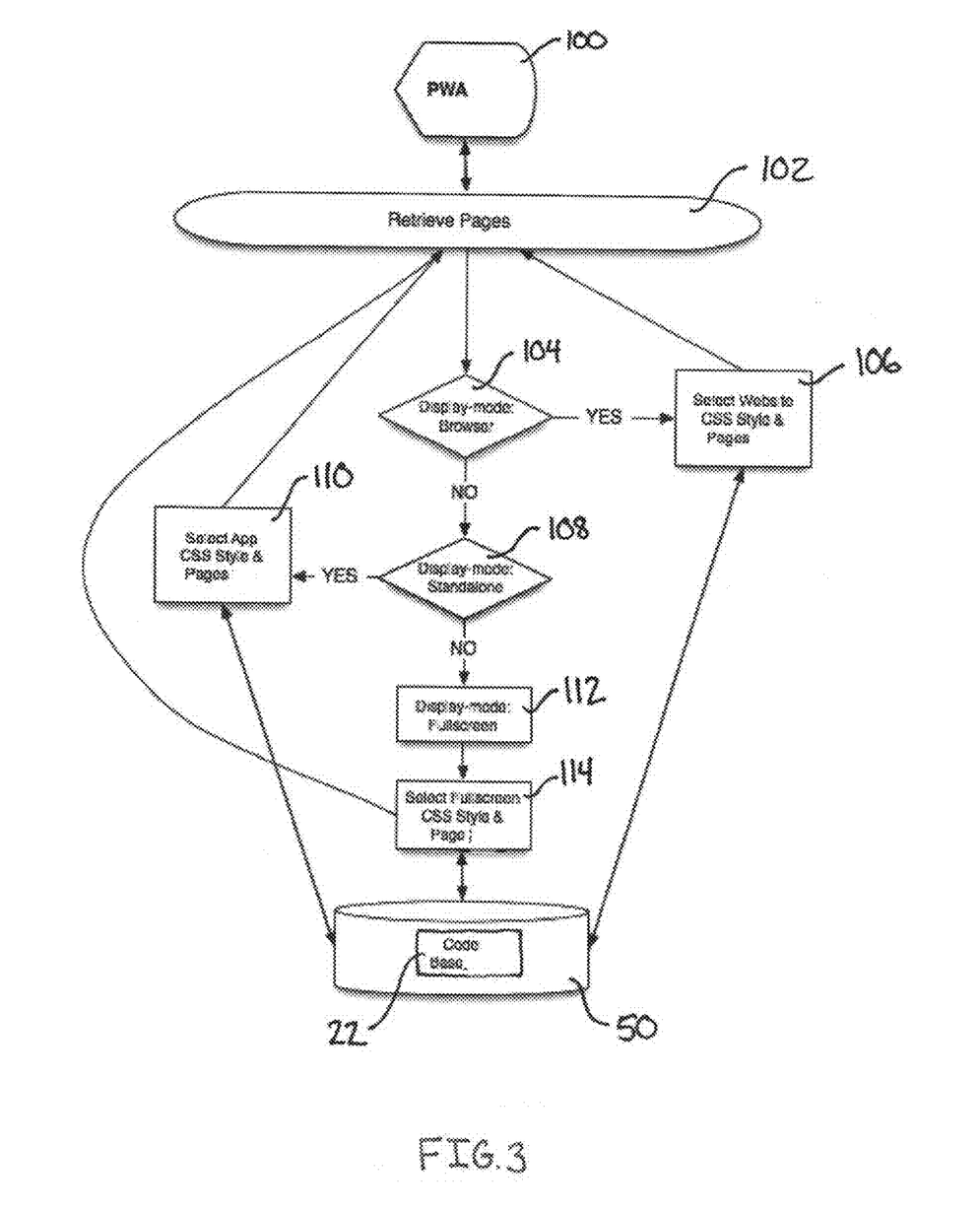
FIG. 3 is a logic flow diagram, illustrating a PWA with two display modes in accordance with an embodiment of the present disclosure.

Referring to FIG. 3, showing a logic flow diagram illustrating an embodiment of the present disclosure, a method for initiating and displaying the different display modes of a PWA is provided. In the example embodiment illustrated in FIG. 3, it will be appreciated that three display modes, including a browser display mode, a standalone web app display mode, and a full screen display mode are provided.

At step 100, a PWA is accessed by a client device, at which point the retrieve pages module, comprising the shell index file, is retrieved from the server and loaded onto the client device. At step 102, the retrieve pages module, such as described above with reference to FIGS. 2 and 5, submits a media query and obtains a result. At step 104, the result of the media query is compared to determine whether the PWA has been accessed by a web browser program installed on the client device. If the PWA has been accessed by a web browser program installed on the client device, the browser display mode is initiated, and at step 106 the web browser program retrieves the PWA browser content, which may comprise, for example, CSS style sheets and webpages, containing the website content that is to be displayed through the web browser program installed on the client device. If the client device is in communication with the server 50 hosting the single code base 22, the PWA browser content is retrieved from the server 50. On the other hand, if the client device is not connected to the internet or another network that is in communication with the server 50, the web browser program cannot retrieve the PWA browser content from the server 50.

At step 108, the result of the media query result is compared to determine whether the PWA has been accessed by a standalone web app bookmarked on the client device. If the media query result is that the PWA has been accessed by the standalone web app bookmarked on the client device, the service worker program installed on the client device retrieves the PWA standalone web app content, at step 110, which may comprise for example, CSS style sheets and webpages, containing the content that is to be displayed through the standalone web app bookmarked on the client device. If the client device is in communication with the server 50 over a network, the service worker program will first determine if the PWA standalone web app content is available from the client device storage memory; if not, the service worker retrieves the PWA standalone web app content from the single code base 22 hosted on the server 50, stores this content in the device storage memory and makes it available to the PWA. On the other hand, if the client device is not connected to a network at the time the media query is performed, the service worker program retrieves the PWA standalone web app content stored in a memory of the client device.

In some embodiments of the present disclosure, the PWA may have a third display mode that may be a full screen display mode, which display mode is initiated when an end user selects a "full screen" command within a web browser program and/or within a PWA standalone web app that is bookmarked on the client device. In such embodiments, whenever such a full screen command is selected by the end user, the full screen display mode is initiated at step 112, and the full screen content is retrieved by the retrieve pages module at step 114. The full screen content may comprise, for example, CSS style sheets and webpages containing the content that is to be displayed through either the web browser program or the bookmarked PWA standalone web app where the end user has selected the "full screen" command.

In some embodiments, the algorithm described at steps 104, 106, 108, 110, 112 and 114 of FIG. 3 are performed on the client device. In other embodiments, after the result is obtained from the media query performed by the retrieve pages module on the client device, the result of the media query may be transmitted to the server, and the server performs the algorithm steps 104, 106, 108, 110, 112 and 114. Additionally, it will be appreciated that the illustrative example of a PWA, as described in FIG. 3, is not intended to be limiting, and that the algorithm may include more or fewer steps, depending on the number of display modes of the PWA, as described elsewhere in the present disclosure.

In one aspect, the PWA disclosed herein enables developers to provide an end user with a PWA that behaves like a native app, without having to distribute the app through a third party app store. As described above, the standalone web app may be bookmarked onto the client device by initiating an "install app" bookmarking command within the web browser program installed on the client device. Optionally, the PWA described herein may also be made available to end users through a third party app store, however it is not necessary to make the PWA available in a third party app store. Such a mechanism for app distribution is advantageous for developers and consumers, from the standpoint that the developer may launch and update the bookmarked standalone web app without the expense and time delays that may be encountered when launching a native app through a third party app store. From the standpoint of both the developer and an end user, the PWA proposed herein is easier to maintain and update.

Regarding the frequency and ease of updating the bookmarked standalone web app, in some embodiments, whenever the bookmarked standalone web app is launched on the client device and the client device is connected to the server 50 via the internet or other network, the service worker compares a prior version ID of the service worker installed on the client device to the current version ID of the service worker hosted on the server. If there is a mismatch between the prior version ID and the current version ID, then the service worker may automatically update the bookmarked standalone web app saved on the device by replacing the service worker having the prior version ID with the service worker program having the current version ID that is retrieved from the single code base hosted on the server, and deleting the service worker program having the prior version ID from the memory of the client device. The service worker program having the updated version ID includes updated standalone web app content which is stored on a memory of the client device. Similarly, for embodiments comprising other display modes, the updated content for each display mode is included in the service worker program having an updated version ID.

In some embodiments, this updating process may be initiated by the end user by automatically prompting the end user to update the standalone web app or other PWA access point on the client device. In other embodiments, the update may automatically occur without prompting the end user, upon the service worker program detecting the mismatch between the current and prior version IDs of the service worker program. Advantageously, this process of updating the standalone web app or other PWA access point bookmarked on the client device enables updating the PWA standalone web app content or other display mode content, without the end user having to retrieve the updates from a third party app store.

Furthermore, this process of updating the standalone web app or other PWA access point facilitates continuous integration and continuous development of the standalone web app content, as the developer is not required to submit the app updates to a third party app store for approval and distribution; instead, the app updates may be made available to end users immediately upon completion of the app update.

Without intending to be limiting, illustrative examples of applying the methods and systems disclosed herein are provided below.

EXAMPLE 1: PIZZA RESTAURANT

A PWA for a pizza restaurant is provided with a browser display mode and a standalone web app display mode. The browser display mode of the PWA may have PWA browser content that provides a website for the restaurant, with a webpage displaying the ordering menu for the end user to call and order and providing functions to place a takeout or delivery order through third parties online; as well as webpages providing the history of the pizza restaurant and giving information to consumers about pizza party bookings and catering offerings. The standalone web app display mode of the pizza restaurant's PWA provides PWA standalone web app content which includes an e-commerce online ordering menu that allows an end user to place orders for delivery or takeout from the restaurant, and includes the additional functions of a loyalty point tracking program, whereby the end user is incentivized to sign up for an account by collecting points for purchases through the standalone web app, which points may be exchanged for free pizzas on future in-app orders, and special coupons exclusive to the app may also be provided through the loyalty point tracking program. Advantageously, the pizza restaurant has a PWA website having a browser display mode that offers all visitors a webpage displaying the ordering menu and provides other information to visitors about services provided by the restaurant, and a standalone web app display mode which provides e-commerce pizza ordering from the restaurant, as well as extra incentives to end users through a loyalty point tracking program, which online ordering and incentives features are not available to users who access the PWA through a web browser program alone.

EXAMPLE 2: COMMERCIAL BANK

A PWA for a commercial bank is provided with a browser display mode, a standalone web app display mode and a full screen display mode. When the browser display mode is launched, the PWA browser content includes webpages that describe the various services offered to consumers, and a client portal that provides clients with online banking services, including the ability for clients to monitor and review their bank statements, transfer funds between accounts and make payments to third parties. When the standalone web app display mode is launched, the PWA standalone web app content does not include the information describing the different services offered by the bank, but does include access to the client portal that provides clients with online banking services, with the provision of extra online banking services that are not available in the browser display mode, including the ability to prepare and submit applications for insurance, mortgages and credit cards or lines of credit provided by the bank. When the full screen display mode of the PWA is launched, the PWA full screen content provides an executive portal that is accessible to upper management bank employees in the form of a dashboard that provides real time information about the bank's daily transactions, and overall performance metrics such as the number of accounts opened and the amount of credit granted over a selected timeframe.

What is claimed is:

1. A method for providing a progressive web app (PWA) having a first display mode content that is distinguished from a second display mode content of the PWA to thereby improve functioning of a client device, the method comprising:
   providing a single code base hosted on a server, the single code base comprising a first display mode content, a second display mode content and a shell index file, the shell index file configured to point to a first index file corresponding to the first display mode content when a first display mode is detected or to a second index file corresponding to the second display mode content when a second display mode is detected;
   wherein, when a browser installed on a client device accesses the shell index file, the shell index file points the browser to the first index file to retrieve the first display mode content from the server;
   wherein, when a second display mode access point bookmarked on the client device accesses the shell index file, the shell index file points a service worker program installed on the client device to the second index file to retrieve the second display mode content from a memory of the client device or from the single code base hosted on the server; and
   wherein the second display mode content comprises second display mode functions and first display mode content comprises first display mode functions, the first display mode functions performing different operations than the second display mode functions.

2. The method of claim 1, wherein the first display mode is a browser display mode, the first display mode content is a browser content comprising first display mode functions that are website functions; and wherein the second display mode is a standalone web app display mode and the second display mode content is a standalone web app content comprising second display mode functions that are app functions, the standalone web app content being accessed through the second display mode that is a PWA standalone web app bookmarked to the client device.

3. The method of claim 2, further comprising providing for installation of the PWA standalone web app on the client device, wherein when a bookmark instruction is initiated on a PWA website accessed through the browser installed on the client device a bookmark link is added to a user interface of the client device; and when the bookmark link is actuated, the service worker program is retrieved from the single code base hosted on the server and installed on the client device, and the PWA standalone web app content is retrieved from the single code base and stored on the memory of the client device.

4. The method of claim 3, wherein when the PWA standalone web app accesses the shell index file, the service worker program compares a current version ID of the service worker program located on the server to a prior version ID of the service worker program stored in the memory of the client device, and automatically retrieves the service worker program and the PWA standalone web app content having the current version ID from the single code base on the server only if the current version ID is not identical to the prior version ID.

5. The method of claim 2, wherein when a full screen display mode command is initiated through the PWA standalone web app installed on the client device, the service worker program automatically retrieves a third display mode that is a full screen display mode, the full screen display mode comprising a full screen content.

6. A method for providing a progressive web app (PWA) website and a PWA standalone web app on a client device from a single code base, the method comprising:
 providing a single code base hosted on a server, the single code base defining a PWA, the PWA comprising a service worker program installable on the client device and a PWA manifest;
 providing for a first media query performed by a web browser installed on the client device, wherein the first media query retrieves a browser display mode and a retrieve pages module retrieves PWA website content of the PWA from the single code base hosted on the server and displays the said PWA website content on the web browser;
 providing for a second media query performed by the web browser of a PWA standalone web app bookmarked on the client device, wherein the second media query retrieves a standalone web app display mode and a retrieve pages module retrieves PWA standalone web app content of the PWA stored on a memory of the client device or from the server and displays the said PWA standalone web app content through the PWA standalone web app bookmarked on the client device; and
 wherein the PWA website content comprises functions and user interfaces that are different from functions and user interfaces of the PWA standalone web app content.

7. The method of claim 6, further comprising providing for installation of the PWA standalone web app on the client device, wherein when a bookmark instruction is initiated on the PWA website accessed through the web browser, the service worker program is retrieved from the single code base hosted on the server and installed on the client device, and wherein the PWA standalone web app content is retrieved from the single code base and stored on the memory of the client device.

8. The method of claim 6, further comprising providing for installation of the PWA standalone web app on the client device, wherein when a bookmark instruction is initiated in a third party app store accessed on the client device, the service worker program is retrieved from the single code base hosted on the server and installed on the client device, and wherein the PWA standalone web app content is retrieved from the single code base and stored on the memory of the client device.

9. The method of claim 6, wherein when the said second media query is performed by the web browser, a current version ID of the service worker program located on the server is compared to a prior version ID of the service worker program stored in the memory of the client device, and if the current version ID mismatches the prior version ID, the service worker program and the PWA standalone web app content stored on the client device are automatically updated with the service worker program on the server having the current version ID.

10. The method of claim 6, wherein the PWA standalone web app bookmarked on the client device accesses one or more peripheral devices of the client device when the standalone web app display mode is initiated.

11. The method of claim 6, wherein when a full screen display mode command is initiated through the PWA standalone web app installed on the client device, the service worker program automatically retrieves a full screen display mode comprising a full screen content.

12. The method of claim 11, wherein the full screen content comprises a static display.

13. The method of claim 6, wherein when a full screen display mode command is initiated through the browser installed on the client device, the browser automatically retrieves the full screen display mode comprising a full screen content.

14. The method of claim 13, wherein the full screen content comprises a static display.

15. A server hosting a single code case defining a progressive web app (PWA), the server comprising:
 a PWA stored on a computer readable memory of the server, the PWA comprising a service worker program installable on a client device, a PWA manifest and a PWA shell index file, the PWA shell index file defining a browser display mode for displaying a PWA website content and a standalone web app display mode for displaying a PWA standalone web app content;
 wherein the PWA website content comprises functions and user interfaces that are different from functions and user interfaces of the PWA standalone web app content;
 wherein the browser display mode is automatically initiated when the PWA is accessed by a web browser installed on the client device; and
 wherein the standalone web app display mode is automatically initiated when the PWA is accessed by a PWA standalone web app bookmarked on the client device.

16. The server of claim 15, wherein when the PWA standalone web app bookmarked on the client device is initiated and the client device is in communication with the server over a network, the service worker program installed on the client device compares a first version ID of the said service worker program to a second version ID of a service worker program of the PWA hosted on the server, and if the first version ID is inequivalent to the second version ID, the service worker program and the PWA standalone web app content stored on a memory of the client device are automatically updated to the service worker program and the PWA standalone web app content having the second version ID and stored on the computer readable memory of the server.

17. The server of claim 15, wherein the PWA shell index file further defines a full screen display mode for displaying a full screen content, and wherein the full screen display mode is automatically initiated when a full screen command is initiated in the web browser installed in the client device or when the full screen command is initiated in the PWA standalone web app bookmarked on the client device.

18. The server of claim 17, wherein the full screen content comprises functions and user interfaces that are different from the functions and user interfaces of the PWA website content and of the PWA standalone web app content.

* * * * *